United States Patent
Xia et al.

(10) Patent No.: US 10,104,639 B2
(45) Date of Patent: Oct. 16, 2018

(54) METHOD AND NODES FOR PAGING IN A RADIO ACCESS NETWORK

(75) Inventors: Qi Xia, Shanghai (CN); Erik De Wit, Rimbo (SE); Lennart Sörenson, Västra Frölunda (SE); Håkan Svensson, Vallda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/413,774

(22) PCT Filed: Jul. 9, 2012

(86) PCT No.: PCT/EP2012/063348
§ 371 (c)(1),
(2), (4) Date: Jan. 9, 2015

(87) PCT Pub. No.: WO2014/008912
PCT Pub. Date: Jan. 16, 2014

(65) Prior Publication Data
US 2015/0139117 A1    May 21, 2015

(51) Int. Cl.
*H04W 68/02* (2009.01)
*H04W 24/02* (2009.01)
*H04W 68/06* (2009.01)

(52) U.S. Cl.
CPC .......... *H04W 68/02* (2013.01); *H04W 24/02* (2013.01); *H04W 68/06* (2013.01)

(58) Field of Classification Search
CPC ...... H04W 24/02; H04W 68/02; H04W 68/06
(Continued)

(56) References Cited

U.S. PATENT DOCUMENTS 5,224,150 A * 6/1993 Neustein ............. H04W 84/022
340/7.25
5,754,739 A * 5/1998 Goldberg ............ H04W 88/185
455/103
(Continued)

FOREIGN PATENT DOCUMENTS

CN    101068370 A    11/2007

OTHER PUBLICATIONS

First Chinese Office Action with Chinese Search Report and English Summary issued in Application No. 201280074603.5 dated Sep. 27, 2017, 13 pages.

*Primary Examiner* — Raj Jain
*Assistant Examiner* — Mahmudul Hasan
(74) *Attorney, Agent, or Firm* — Rothwell, Figg, Ernst & Manbeck, P.C.

(57) ABSTRACT

A method for paging a user equipment, UE, in a radio access network, RAN, served by a core network node. When a UE attaches to the radio access network, a service area identity included in the respective a respective registration message from each UE, is received and registered in the core network node. The method further includes a step of receiving one or more data packets to be sent to a receiving UE attached to the network and determining a permitted latency for delivery of the one or more data packets to the UE. When permitted latency exceeds a predetermined latency threshold, a step of retrieving the registered SAI for the receiving UE is performed. In a concluding step in the method of paging, a first page is performed of the UE, directing the first page to cells belonging to a first paging area determined by the retrieved SAI.

19 Claims, 5 Drawing Sheets

(58) Field of Classification Search
USPC .............................. 370/329; 455/458, 435.1
See application file for complete search history.

(56) References Cited

U.S. PATENT DOCUMENTS

| | | | | |
|---|---|---|---|---|
| 7,782,796 | B2* | 8/2010 | Haley | H04L 41/12 370/254 |
| 8,923,178 | B2* | 12/2014 | Anderson | H04W 52/0219 370/252 |
| 2004/0142706 | A1* | 7/2004 | Kim | H04W 4/06 455/458 |
| 2005/0153714 | A1* | 7/2005 | Subrahmanya | H04W 68/00 455/458 |
| 2006/0128395 | A1* | 6/2006 | Muhonen | H04W 60/00 455/456.1 |
| 2007/0097861 | A1* | 5/2007 | Wilde | H04L 41/5003 370/229 |
| 2007/0217343 | A1* | 9/2007 | Znamova | H04J 3/0682 370/252 |
| 2008/0057955 | A1* | 3/2008 | Choi-Grogan | H04W 8/04 455/435.1 |
| 2008/0220769 | A1* | 9/2008 | Qi | H04W 68/02 455/426.1 |
| 2009/0073985 | A1* | 3/2009 | Rogers | H04L 47/115 370/395.4 |
| 2009/0086704 | A1* | 4/2009 | Ho | H04L 1/1685 370/346 |
| 2009/0264095 | A1* | 10/2009 | Khetawat | H04L 63/104 455/404.2 |
| 2010/0062768 | A1* | 3/2010 | Lindqvist | H04W 8/26 455/435.1 |
| 2010/0085962 | A1* | 4/2010 | Issaeva | H04W 76/041 370/355 |
| 2010/0103822 | A1* | 4/2010 | Montwill | H04L 41/0645 370/242 |
| 2010/0144362 | A1* | 6/2010 | Bernard | H04L 12/2856 455/452.1 |
| 2010/0254313 | A1* | 10/2010 | Hallenstal | H04L 29/12311 370/328 |
| 2011/0075557 | A1* | 3/2011 | Chowdhury | H04L 12/14 370/230 |
| 2011/0103310 | A1* | 5/2011 | Stojanovski | H04L 12/66 370/328 |
| 2011/0136517 | A1* | 6/2011 | Seppalainen | H04W 68/02 455/458 |
| 2011/0283011 | A1* | 11/2011 | Li | H04L 12/14 709/231 |
| 2011/0286465 | A1* | 11/2011 | Koodli | H04W 68/00 370/401 |
| 2012/0230186 | A1* | 9/2012 | Lee | H04L 43/028 370/230 |
| 2013/0052959 | A1* | 2/2013 | Rubin | H04W 24/08 455/67.11 |
| 2013/0145041 | A1* | 6/2013 | Ruffini | H04J 3/0673 709/238 |
| 2013/0316706 | A1* | 11/2013 | Knauft | H04W 68/04 455/435.1 |

* cited by examiner

METHOD AND NODES FOR PAGING IN A RADIO ACCESS NETWORK

CROSS REFERENCE TO RELATED APPLICATION(S)

This application is a 35 U.S.C. § 371 National Phase Entry Application from PCT/EP2012/063348, filed Jul. 9, 2012, designating the United States, the disclosure of which is incorporated herein in its entirety by reference.

TECHNICAL FIELD

The present invention relates to an enhanced method for paging user equipment in a UMTS radio access network served by a core network node, wherein a service area identity included in a user equipment message is used in the paging of the user equipment. The present invention also relates to a core network node and a radio access node configured to perform the enhanced method for paging.

BACKGROUND

In a typical cellular radio system, wireless terminals communicate via a radio access network, RAN, with one or more core networks. The wireless terminals can be mobile stations or other types of user equipment, UE, such as portable, pocket, hand-held, computer-included, or car-mounted mobile devices which communicate voice and/or data with radio access network, e.g., mobile telephones and laptops with wireless capability.

The RAN covers a geographical area which is divided into cell areas. Within the cell area, radio coverage is provided by equipment at the radio access node including a base station, also known as a NodeB, and a radio network controller, RNC. Each cell is identified by an identity within the local radio area. The radio access nodes communicate over the air interface with the UE within the cells served by the node. A multitude of base stations including the radio transceiver equipment are controlled by a single radio network controller, RNC. The RNC handles the allocation of radio channels, signaling to UE and controls handovers from base station to base station among other tasks.

The radio network controller, RNC, controls a set of base stations connected to the RNC. The RNC carries out radio resource management and some of the mobility management functions. The RNC connects to the core network. The signaling protocol responsible for communication over the Iu interface between the RNC and the core network is the RANAP, radio access network application part.

The Universal Mobile Telecommunications System, UMTS, is a third generation mobile communication system, which evolved from the Global System for Mobile Communications, GSM, and is intended to provide improved mobile communication services based on Wideband Code Division Multiple Access, WCDMA, access technology. UTRAN is essentially a radio access network using wideband code division multiple access for user equipment units, UEs.

Paging is used for network-initiated connection setup. Each time a UE attaches to the network, it also performs an update and registers to a routing area or location area. The location update procedure allows a mobile device to inform the cellular network, whenever it moves from one location area to the next. Mobiles are responsible for detecting location area codes. When a mobile finds that the location area code is different from its last update, it performs another update by sending to the network, a location update request.

A "location area" is a set of base stations that are grouped together to optimize signaling. Typically, tens or even hundreds of base stations may share a single radio network controller, RNC, in UMTS. If the location areas are very large, there will be many mobiles operating simultaneously, resulting in very high paging traffic, as every paging message has to be broadcast to every cell in the location area. This wastes radio resources in the radio link, which is a scarce resource within the radio access network. If on the other hand, there are many small location areas, the mobile must contact the network very often for changes of location. A balance must therefore be sought when defining the extent of a location area.

In the packet switched domain a routing area is equivalent of the location area. A "routing area" may be a subdivision of a "location area". With the increasing amount of packet data being delivered to smart phones or other types of user equipment signing up for automatic updates of information, more paging messages are being sent per mobile. Present functionality in UMTS for paging requires paging on the air interface to all cells in a routing area. Paging constitutes a large part of the signaling load for packet data. An increasing amount of data packets to be delivered to user equipment increases the signaling load in the radio interface and consumes air interface resources.

What is needed therefore, and an object of the technology described herein, is to provide solutions that reduces paging load in a 3G network, e.g. an UMTS network.

SUMMARY

It is an object of embodiments of the invention to provide solutions that reduces paging load in a cellular communication network; reducing signaling in the air interface of a radio access network whilst upholding the paging success rate.

In accordance with a method embodiment of the invention for paging a user equipment, UE in a radio access network served by a core network node, a service area identity is included in the respective messages from each UE upon signaling to the radio access network. The service area identity, SAI, included in the message is received and registered in the core network node. The embodiment further includes a set of steps performed in the core network node, wherein one or more data packets to be sent to a receiving UE attached to the network are received in the core network node. A permitted latency for delivery of the one or more data packets to the UE is determined. When permitted latency exceeds a predetermined threshold, the registered SAI for the receiving UE is retrieved. A first page of the UE is directed to cells belonging to a first paging area; the first paging area determined by the retrieved service area identity.

An embodiment of a core network node serving a radio access network to which one or more user equipment is attached comprises a network communication unit, a processor and a memory. The network communication unit is configured to receive and transmit radio access network application protocol messages. The processor is configured to process a received radio access network application protocol message to the retrieve a service area identity, SAI, received for a UE in the radio access network and the memory is configured to store the SAI for a respective UE. The processor is further configured to retrieve the SAI stored for a respective UE from the memory on receipt of one or more data packets to be sent to the UE and for which permitted latency exceeds a predetermined threshold and to include the SAI in a RANAP paging message.

An embodiment of a radio access node in a radio access network to which one or more user equipment is attached comprises a network communication unit and a processor. The network communication unit is configured to receive and transmit radio access network application protocol messages. The processor is configured to process a received radio access network application protocol, RANAP, paging message to retrieve a service area identity, SAI, in the RANAP paging message and to initiate a first page of a UE to a paging area determined from the SAI retrieved from the paging message.

It is an advantage of the invention that it limits the sending of paging messages on the air interface to one or more cells where the UE most likely is located, thereby limiting the paging load in the air interface whilst upholding the paging success rate.

DETAILED DESCRIPTION

Figure 1:
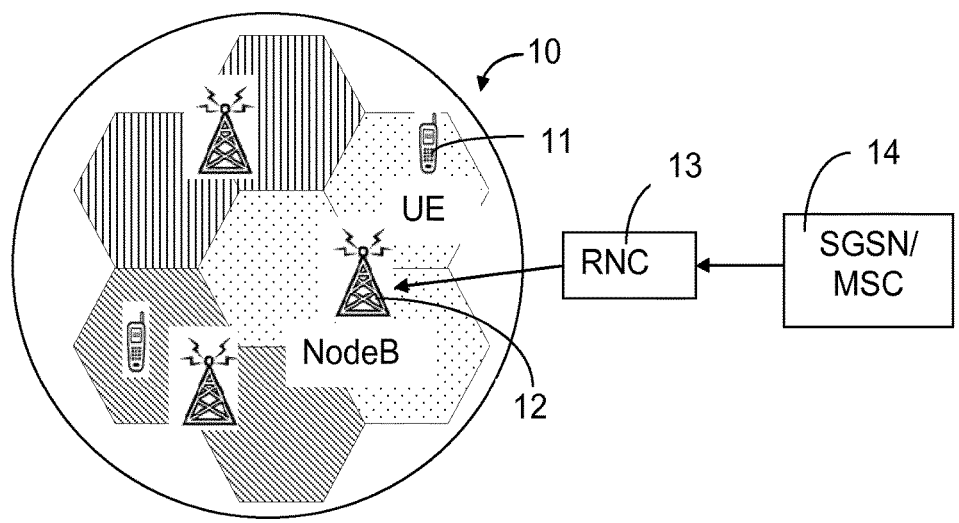
FIG. 1 is a schematic view of an exemplary network.

FIG. 1 shows a schematic view of an exemplary cellular communication network 10, wherein the invention may be implemented. A plurality of NodeBs 12, also known as base stations, provides the air interface to user equipment UE 11 in one or more respective cells within a location or routing area. In FIG. 1, cells wherein the air interface is established by means of a common NodeB are illustrated as a group of cells by applying a common pattern to each illustrated cell. A plurality of NodeBs 12 within a location area or routing area is controlled by a single radio network controller, RNC 13. The RNC 13 handles radio resource management and some of the mobility management functions, e.g., allocation of radio channels, signaling to UE and controls handovers from NodeB to NodeB. The RNC 13 is connected to a serving GPRS supporting node SGSN and mobile switching center MSC 14 over the Iu interface. The signaling protocol responsible for communication over the Iu interface between the RNC and the core network is the RANAP, radio access network application part.

Figure 2:
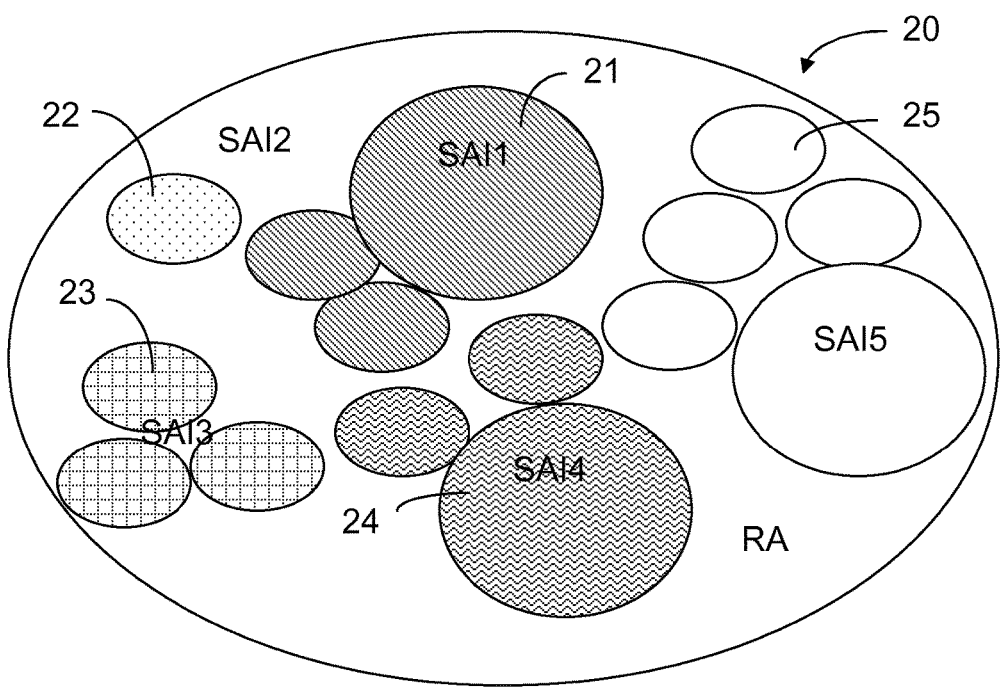
FIG. 2 is a schematic view of a routing area

FIG. 2 is a schematic view of a routing area 20 in a UMTS wireless network. The routing area 20 is subdivided into a plurality of service areas 21-25. In the illustrated routing area, a first service area 21 is surrounded by four neighboring service areas 22-25. Cells belonging to a common service area are illustrated by a common pattern applied to these cells. Typically, as illustrated, a service area SA contains one or a few cells and is a small subset of the routing area. The service area is a concept used in the 3GPP standard to provide information to the core network on the location of a user equipment, UE, in the cellular communication network. In present standard, information on a cell basis is not available to the core network identifying the last known presence of a UE in a specific cell. A service area is identified by service area identifiers SAI. In FIG. 2, 5 service areas are illustrated identified by corresponding service area identifiers SAI1-SAI5. A first cell of a service area may be served by a first base station, while a second cell of the service area is served by a second base station, but all cells of a service area may also be served by one common base station. There is no specified relationship between the concept of service areas and that of base stations.

Figure 3:
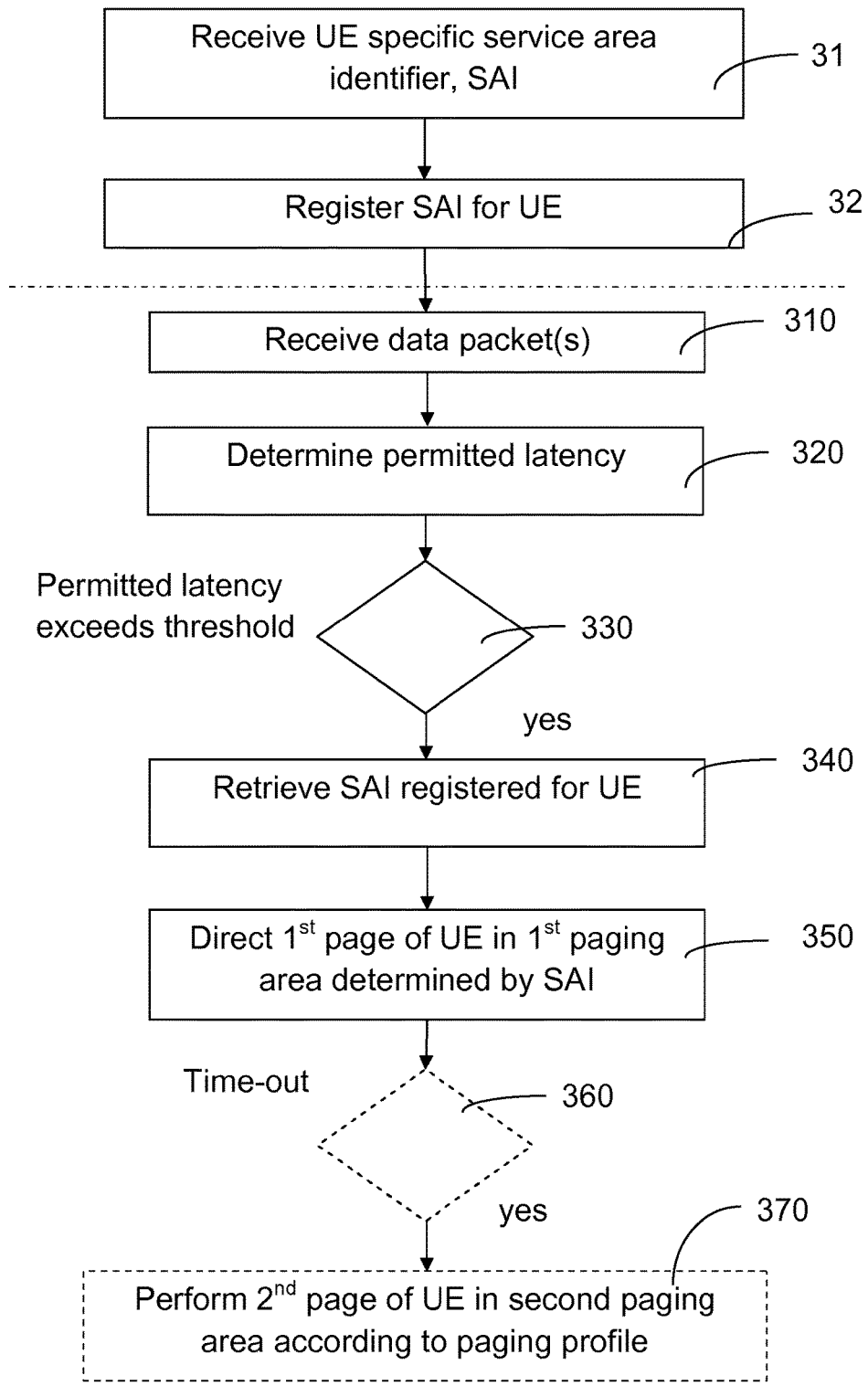
FIG. 3 is a flowchart illustrating an embodiment of method steps.

FIG. 3 discloses basic, representative, non-limiting flow chart including example steps which can be performed in an exemplary embodiment of the invention. The disclosed exemplary method is a method for paging user equipment, UE, in a radio access network, i.e. the radio interface of the cellular communication network. The radio access network is presumed to be communicatively connected to the core network by means of the serving GPRS supporting node in the mobile switching center MSC 14 as illustrated in FIG. 1.

In a preparatory step 31, a UE will perform a service area registration procedure during signaling to the radio access network. Such service area registration could be included in signaling when the UE attaches to the network by sending an attach request message or detects a change of routing area and sends a routing area update request message to the SGSN/MSC. The registration could also be included in signaling upon UE connection release, as illustrated in Table 1 below. The service area registration may also be included in other types of messages whereby a UE initiates or responds to signaling or payload messages from the network, such as radio resource connection RRC request messages or activate PDP context request. According to a present standard for the Iu interface between a radio access node and the core network node, the messages are transferred in a radio access network application protocol RANAP message, e.g. in initial UE message or direct transfer messages. The core network node receives information on a recent service area identity, SAI, in a message from a respective UE. In order to increase SAI information reliability for UE served by the RAN, service area identity information may also be included in a RANAP Iu Release complete message sent when a UE releases a connection to the core network node. In an embodiment of the invention, the message format for RANAP Iu Release Complete is extended by adding SAI, as shown in table 1 illustrating the extended RANAP Iu Release Complete message with reference to 3GPP TS 25.413. The added SAI is presented on the last row of the table.

TABLE 1

| IE/Group Name | Presence | Range | IE type and reference | Criticality | Assigned Criticality |
|---|---|---|---|---|---|
| Message Type | M | | 9.2.1.1 | YES | reject |
| RABs Data Volume | O | | | YES | ignore |

TABLE 1-continued

| IE/Group Name | Presence | Range | IE type and reference | Criticality | Assigned Criticality |
|---|---|---|---|---|---|
| Report List |  |  |  |  |  |
| >RABs Data Volume Report Item IEs |  | 1 to <maxnoofRABs> |  | EACH | ignore |
| >>RAB ID | M |  | 9.2.1.2 | — |  |
| >>RAB Data Volume Report List | O |  |  | — |  |
| >>>RAB Data Volume Report Item IEs |  | 1 to <maxnoofVol> |  | — |  |
| >>>>Unsuccessfully Transmitted DL Data Volume | M |  | 9.2.3.12 | — |  |
| >>>>Data Volume Reference | O |  | 9.2.3.13 | — |  |
| Message Type | M |  | 9.2.1.1 | YES | reject |
| RABs Data Volume Report List | O |  |  | YES | ignore |
| >RABs Data Volume Report Item IEs |  | 1 to <maxnoofRABs> |  | EACH | ignore |
| RABs Released List | O |  |  | YES | ignore |
| >RABs Released Item IEs |  | 1 to <maxnoofRABs> |  | EACH | ignore |
| >>RAB ID | M |  | 9.2.1.2 | — |  |
| >>DL GTP-PDU Sequence Number | O |  | 9.2.2.3 | — |  |
| >>UL GTP-PDU Sequence Number | O |  | 9.2.2.4 | — |  |
| Criticality Diagnostics | O |  | 9.2.1.35 | YES | ignore |
| SAI | O |  | 9.2.3.9 | YES | ignore |

In a subsequent preparatory step, the service area identity SAI is registered in the core network node, wherein a SGSN/MSC 14 illustrated in FIG. 1 is one embodiment of such a core network node. In the subsequent preparatory step 32, the service area identity is registered in the core network node in the meaning that information on the service area identity SAI is stored for the requesting UE in the core network node so that there is information on last known SAI available for each UEs requesting or having requested a radio resource connection.

With access to information in the core network node on last known SAI for each UE attached to the radio access, the illustrated embodiment of a method for paging a user equipment UE in a radio access network RAN may be continued by a sequence of steps performed in the core network node.

In step 310 one or more data packets 310 is received in the core network node for delivery to a specific receiving UE attached to the network. The nature of the data traffic represented by the data packets affects the possibility to allow for paging in accordance with an escalating procedure. The possibility to allow for paging in accordance with an escalating procedure, may also be affected by the type of subscription held by a UE, a time stamp identified for the data packets to be delivered and aspects relating to needed accuracy of the location information when delivering a service to the UE. Prior to attempting paging according to the disclosed embodiment of the invention, a permitted latency for delivery of data packets to the receiving UE is determined in step 320.

When permitted latency exceeds a predetermined threshold in step 330, the SAI stored for the receiving UE will be retrieved in step 340 and included in a paging message to the UE, e.g. in an extended RANAP Paging message as illustrated in Table 2.

TABLE 2

| IE/Group Name | Presence | Range | IE type and reference | Criticality | Assigned Criticality |
|---|---|---|---|---|---|
| Message Type | M |  | 9.2.1.1 | YES | ignore |
| CN Domain Indicator | M |  | 9.2.1.5 | YES | ignore |
| Permanent NAS UE Identity | M |  | 9.2.3.1 | YES | ignore |
| Temporary UE | O |  | 9.2.3.2 | YES | ignore |

TABLE 2-continued

| IE/Group Name | Presence | Range | IE type and reference | Criticality | Assigned Criticality |
|---|---|---|---|---|---|
| Identity | | | | | |
| Paging Area ID | O | | 9.2.1.21 | YES | ignore |
| Paging Cause | O | | 9.2.3.3 | YES | ignore |
| Non Searching Indication | O | | 9.2.1.22 | YES | ignore |
| DRX Cycle Length Coefficient | O | | 9.2.1.37 | YES | ignore |
| Global CN-ID | O | | 9.2.1.46 | YES | ignore |
| CSG Id List | | 0 to <maxnoofCSGId> | | YES | ignore |
| >CSG Id | M | | 9.2.1.85 | | |
| SAI | O | | 9.2.3.9 | YES | ignore |

In step 350, a first page of the UE in cells belonging to a first paging area is performed, directing the page to cells determined by the service area identity SAI.

In an embodiment of the method for paging, the first paging area is determined to be the service area represented by the SAI. In an alternative embodiment, the first paging area is the service area represented by the SAI and one or more neighboring service areas. These neighboring service areas may be determined by the core network node, but it may also be the radio access node that selects a number of neighboring cells from the SAI received in the RANAP paging message. In a further embodiment of the method for paging, the first paging area is selected in the radio access node upon receipt of a core network paging message including SAI. In such an embodiment, the radio access node may hold information on a paging policy to be executed by the radio access node on receipt of a paging message including a SAI. Based on the paging policy, the radio access node can decide to page in cells belonging to neighbor service areas of the service area identified by the SAI in the RANAP paging message. Such a decision may depend on the paging policy set for the radio access node, e.g. by an operator. The policy may be based on cell location or size. For small cells in a city or highly populated area, it may be beneficial to distribute the page to neighbor cells. In other circumstances with larger cells in the country side, the page may be limited to the one or more cells corresponding to the service area identified by the SAI.

When roaming within a routing area, a UE may move out of a first service area and into a second service area without sending an updated service area identity to the core network node storing information on the last known service area identity of the UE. This means that the stored SAI, may no longer be valid at the time of paging of the UE. The core network node should in such instances attempt to page the UE in a wider paging area as a second page as illustrated in step 370, when time-out has been determined for the response to the page performed in the first paging area in step 360.

A paging profile may be stored in the core network node for the enabling an escalated page in a second paging area. Such a paging profile could include information on the extent of a second paging area for a subsequent paging. The second paging area may be the routing area of the UE, thus performing a traditional paging procedure for the UE. However, the second paging area may also include neighboring service areas to the service area identified by the SAI stored for the UE in the core network node. Such an escalated page to one or more neighboring service areas, could provide the advantage of a reduced signaling load of the radio access network whilst improving the possibility for a page response from the UE.

The paging behavior in the core network node can be controlled by using paging profiles that specify how many paging attempts that may performed within a given paging area before escalating the page to a wider paging area. A paging profile can be selected based on the parameters in a paging profile selection table. Some criteria that can be used in the paging profile selection table includes: Allocation and Retention Priority (ARP), Access Point Name (APN), QoS Class Identifier (QCI), International Mobile station Equipment Identity (IMEI) number series, International Mobile Subscriber Identity (IMSI) number series, traffic class and time since last reported location. The core network node may begin the paging procedure by going through the paging profile selection table. The match to a UE and its PDP contexts/bearers determines which paging profile to use. The paging profile selection table can be used to select a paging profile starting at a $1^{st}$ paging area with a narrow paging width for a certain UE.

Figure 4:
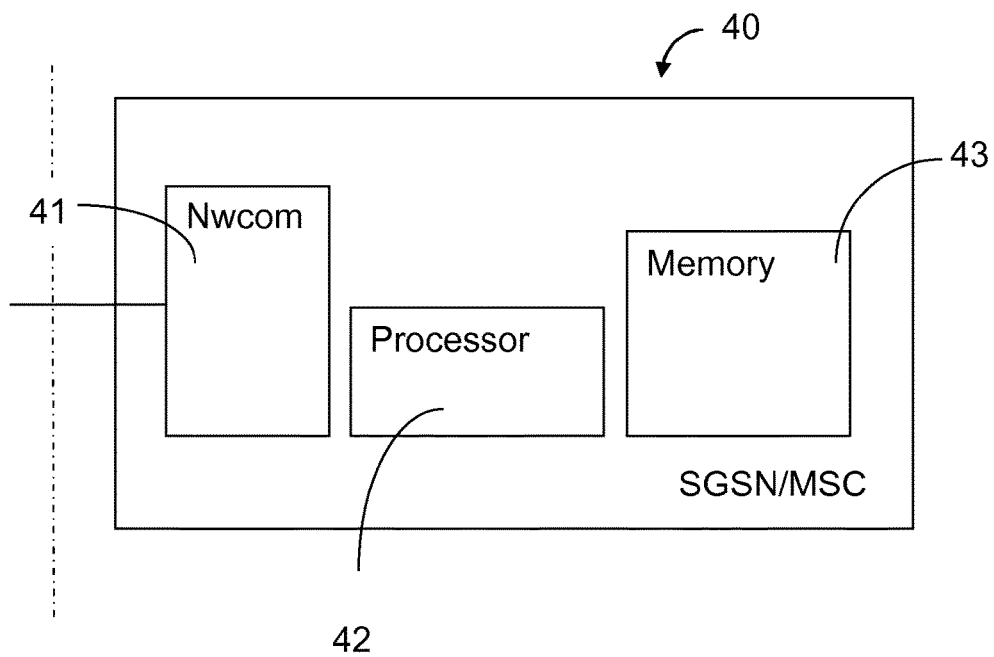
FIG. 4 is a block diagram of a core network node according to an embodiment of the invention.

The invention also relates to a core network node 40, in FIG. 4 illustrated as a serving GPRS supporting node SGSN/mobile switch center MSC according to a preferred embodiment of the invention. The core network node is configured to serve a radio access network to which one or more user equipment UE is attached. FIG. 4 illustrates an embodiment of the core network node including features essential for contributing to the performance of the claimed method for paging a user equipment. The illustration should not be mistaken for a comprehensive disclosure of entities in a core network node and the omission of any such entity from the simplified block diagram is not limiting to the invention.

The core network node, as disclosed in FIG. 4, includes a network communication unit 41 configured to receive and transmit radio access network application protocol messages RANAPs as exemplified in Table 1 and 2 above. A processor 42 is configured to process the received RANAPs and to retrieve the information on service area identity for a specific UE. A memory 43 in the core network node, stores each service area identity for a respective UE, so that a SAI may be retrieved for each UE to be paged in the radio access network. The processor 42 is further configured to determine permitted latency for delivery of the one or more data packets to the UE. Such determination may be made from subscription information retrieved from the memory, evaluation of the nature of the data packets to deliver and type of service for delivery of the data packets or the reading of a time stamp associated with the data packets. The processor is configured to retrieve the SAI stored for a respective UE from the memory on receipt of one or more data packets to be sent to the UE. The processor investigates if permitted latency exceeds a predetermined threshold, and is further configured to initiate transmission of a radio access network application protocol message, including a paging message to the UE to be sent in a service area as identified by the SAI, over the network communication unit to a receiving radio access node.

Figure 5:
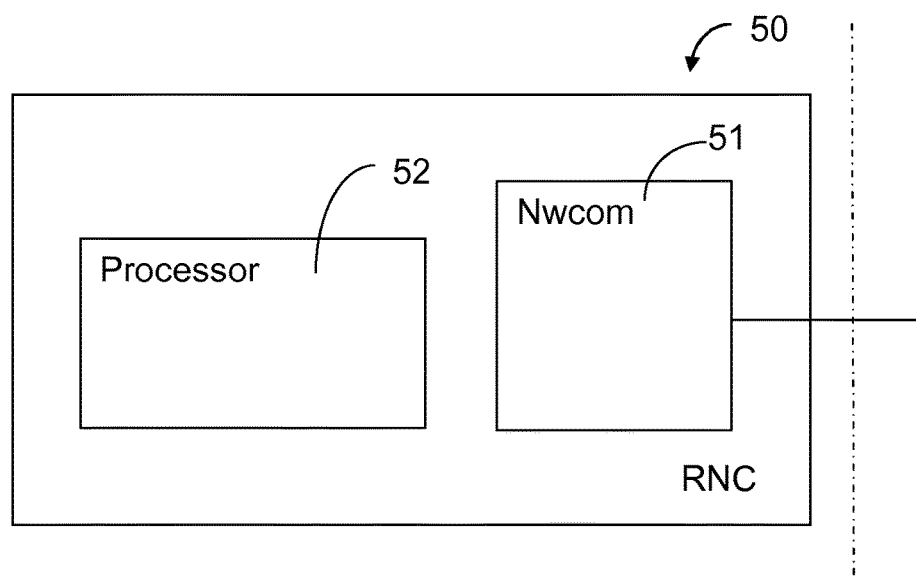
FIG. 5 is a block diagram of a radio access node according to an embodiment of the invention,
FIG. 6
  a. is a signaling sequence for an embodiment of the invention
  b. is a signaling sequence for another embodiment of the invention.

The invention also relates to a radio access node 50, in FIG. 5 illustrated as a radio network controller RNC according to a preferred embodiment of the invention. FIG. 5 illustrates an embodiment of the radio access node including features essential for contributing to the performance of the claimed method for paging a user equipment. The illustration should not be mistaken for a comprehensive disclosure of entities in a radio access and the omission of any such entity from the simplified block diagram is not limiting to the invention.

The radio access node 50, as disclosed in FIG. 5, includes a network communication unit 51, configured to receive and transmit radio access network application protocol messages RANAPs, e.g., as exemplified in Table 1 and 2 above. A processor 52 in the radio access node 50 is configured to process a received radio access network application protocol, RANAP, paging message and to page a UE in the radio access network based on information in the RANAP paging message, wherein paging of the UE is performed in one or more cells. The processor is further configured to retrieve a service area identity, SAI, and to initiate a first page of a UE to a first paging area determined from the SAI retrieved from the paging message.

Figure 6A:
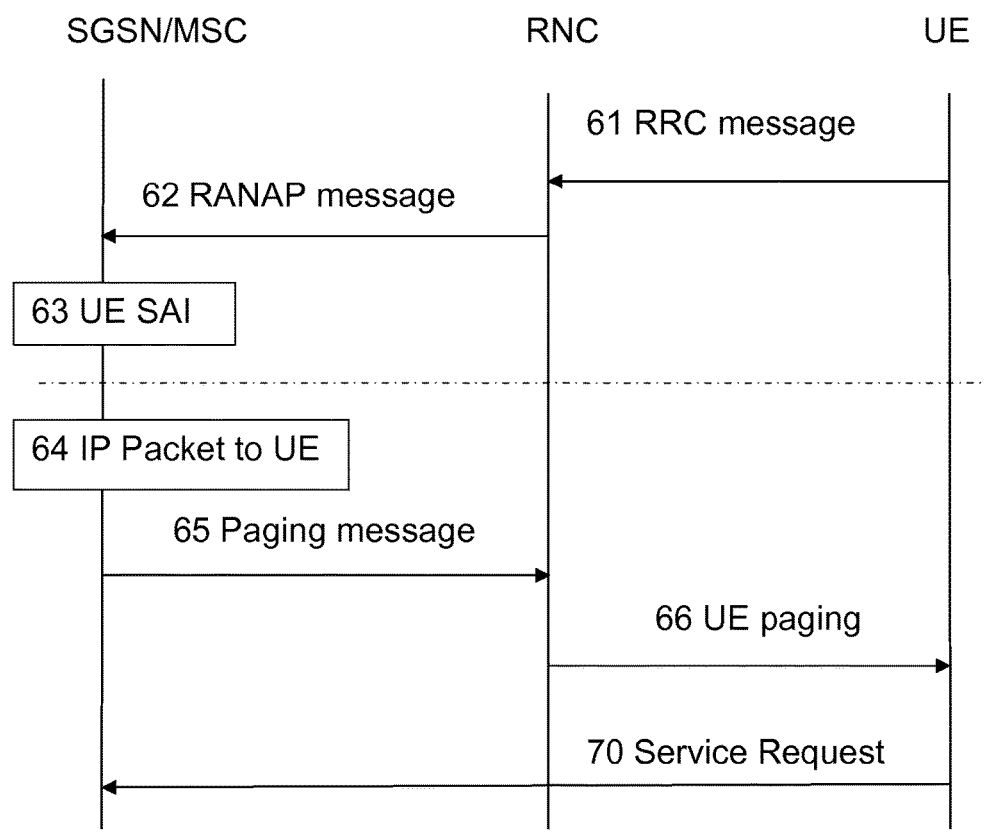
Figure 6B:
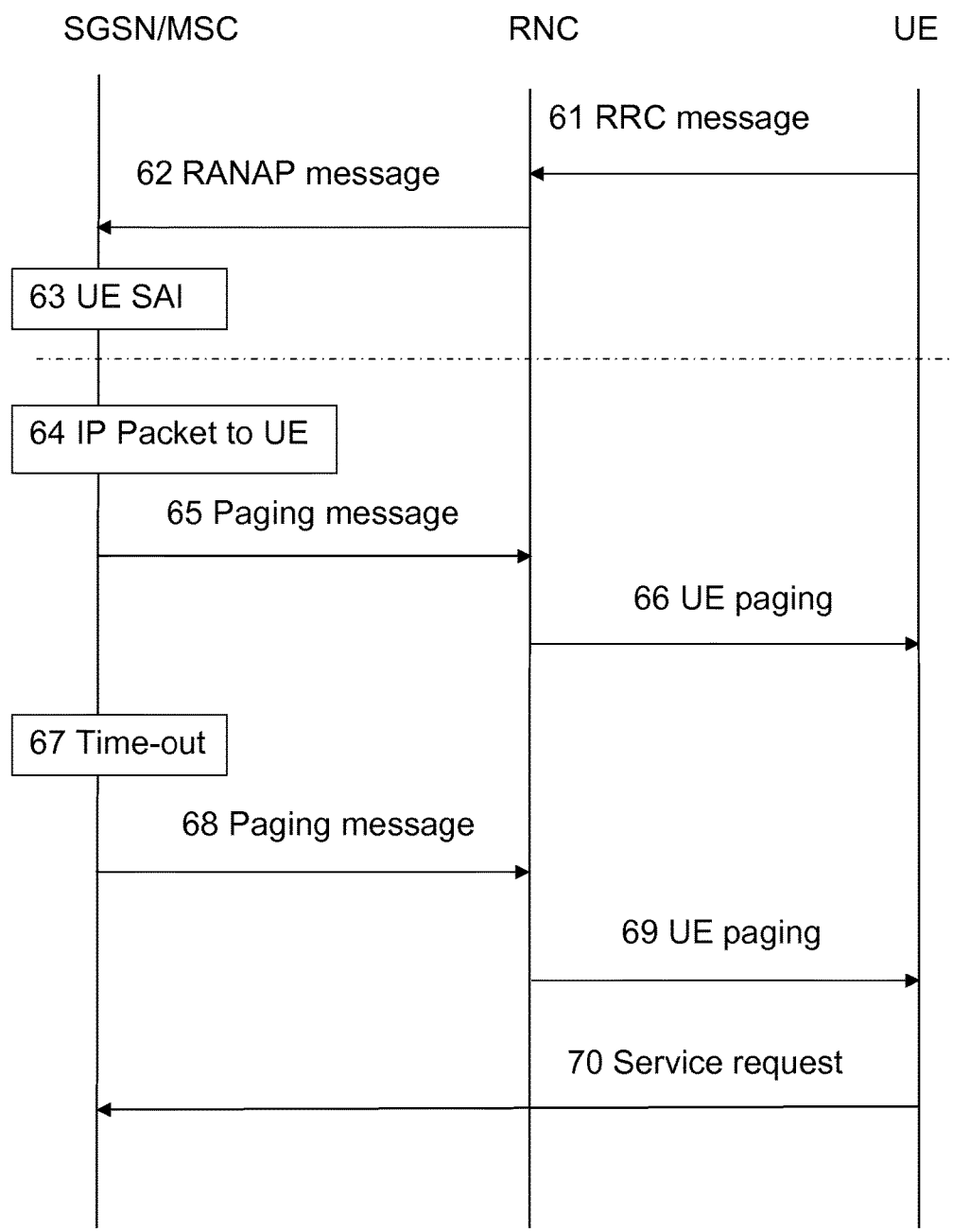

FIGS. 6a and 6b discloses exemplary signaling sequences, illustrating signaling performed in the process of executing the method of paging a user equipment in accordance with embodiments of the invention. The signaling sequences each include a preparatory phase and a paging phase. A dashed line is included in each signaling sequence according to FIG. 6a, 6b to illustrate this partitioning of the signaling in a preparatory phase and the paging phase. The dashed line also symbolizes a time period with no connection to the UE. The signaling sequences is illustrated for performing embodiments of the invention in a serving GPRS supporting node/mobile switch center SGSN/MSC and a radio network controller. It is within the scope of the invention, for signaling to be performed between other types of core network nodes and radio access nodes.

Information on current service area identity, SAI, is included in a RRC message 61, e.g. a RRC direct transfer message. The signal from the UE is received in the RNC that transmits a RANAP message 62 representing the RRC message being a direct transfer to the SGSN/MSC. In the SGSN/MSC, the UE SAI 63 is retrieved from the RANAP message 62 and stored locally within the SGSN/MSC. In a situation where the radio access network sends a Iu Release completion RANAP signal as RANAP message 62, the information relating to service area identity is based on the latest SAI information available, i.e., delivered previously in a RRC message 61. Following receipt of a IP packet to be sent to a specific UE 64, a paging message 65 is transmitted by the SGSN/MSC. The paging could be an extended RANAP paging message according to Table 2. The RNC directs paging of the UE in the radio interface to specific one or more cells as indicated by a service area identity in the paging message 65. The paging is concluded when a service request 70 is received from the UE, transferred by the RNC to the SGSN/MSC.

FIG. 6b illustrates the situation where a preset timer period is exceeded, following transmission by the RNC of the UE paging signal 66. Following the time-out, a paging message to a first page area may be repeated in accordance with what is defined in a paging profile, but may also be escalated to a second paging area including additional cells in comparison to the number of cells that are included in the first paging area. The second paging area could include cells included in neighboring service areas to the service area stored for the UE, or the routing area to which the UE is registered. The paging is concluded when a service request 70 is received from the UE, transferred by the RNC to the SGSN/MSC.

Repeated or additional paging escalation are within the scope of the invention, but is not illustrated in further signaling sequences. Repeated or additional paging escalation may take place when a time-out occurs following the UE paging 69.

By introducing a paging procedure using a service area based paging, the signaling over the air interface between the radio access node and a UE can be reduced significantly. Since the radio resource is the scarcest resource in a cellular communication radio network, any procedure that significantly reduces signaling messages over the air interface greatly improves the throughput and performance in the cellular communication radio network.

The above description provides details on a number of possible embodiments of the invention that are non-limiting to the invention. The embodiments serve as illustration of some of presently preferred embodiments of the invention, but does not determine or limit the scope of the invention. The scope of the present invention also encompasses other embodiments which may become obvious to those skilled in the art, and the scope of the present invention is not to be limited by anything but the appended claims.

The invention claimed is:

1. A method for paging a user equipment, UE, in a radio access network, RAN, served by a core network node, wherein, upon UE signaling to the RAN, a service area identity, SAI, included in a respective message from each UE, the SAI is received and registered in the core network node, the method performed in the core network node comprising:
   the core network node receiving one or more data packets to be sent to the UE, which is attached to the radio access network;
   analyzing the received one or more data packets by extracting information included in the one or more received data packets;
   the core network node determining a predetermined permitted latency for delivery of the one or more data packets to the UE in accordance with the information extracted from the received one or more data packets, the predetermined permitted latency specifying an amount of time that is permitted for delivery of the received one or more data packets to the UE upon reception at the core network node;
   in response to determining that the predetermined permitted latency exceeds a predetermined latency threshold, (i) the core network node retrieving the SAI registered for the UE, and (ii) the core network node directing a first page of the UE to cells belonging to a first paging area, wherein the first paging area is determined by the retrieved SAI.

2. The method according to claim 1, wherein the first paging area determined by the SAI is the service area represented by the SAI.

3. The method according to claim 1, wherein the first paging area determined by the SAI is the service area represented by the SAI and one or more neighboring service areas.

4. The method according to claim 3, wherein the first paging area is selected in the radio access node upon receipt of a core network paging message including the SAI.

5. The method according to claim 1, wherein the extracted information specifies a permitted latency for a receiving service.

6. The method according to claim 1, wherein the extracted information specifies a permitted latency for a UE subscription.

7. The method according to claim 1, wherein the page is included in a radio access network application protocol, RANAP, paging message and wherein the paging message includes the SAI.

8. The method according to claim 1, wherein a second page of the UE is performed in cells belonging to a second paging area upon time-out of the first page in the first paging area.

9. The method according to claim 1, wherein paging is performed based on information provided in a predetermined paging profile.

10. The method according to claim 9, wherein the paging profile specifies a number of times to perform a first page in the service area represented by the SAI prior to switching to the second page in the second paging area.

11. The method according to claim 9, wherein the paging profile specifies how many paging attempts the core network entity can perform in the first paging area before paging the UE in an area larger than the first paging area.

12. The method according to claim 1, wherein the core network node is a serving general packet radio service, GPRS, supporting node, SGSN, in a mobile switch center, MSC.

13. The method according to claim 1, wherein the permitted latency is determined in accordance with a type of service required for delivery of the one or more packets to the UE.

14. The method according to claim 1, further comprising:
analyzing a paging profile table that contains a plurality of paging profiles; and
selecting a paging profile from the plurality of paging profiles in accordance with the analysis, wherein paging is performed in accordance with the selected paging profile.

15. The method according to claim 1, wherein the analysis of the paging profile table includes determining whether the UE is associated with one or more paging profile table parameters that include at least one or more of Allocation and Retention Priority (ARP), Access Point Name (APN), QoS Class Identifier (QCI), International Mobile station Equipment Identity (IMEI) number series, International Mobile Subscriber Identity (IMSI) number series, traffic class, and time since last reported location.

16. A core network node serving a radio access network, RAN, to which one or more user equipment, UE, is attached, the core network node comprising:
a network communication unit configured to receive a radio access network application protocol message;
a processor configured to process the received radio access network application protocol message to retrieve a service area identity, SAI, received for a UE in the RAN; and
a memory configured to store the SAI for a respective UE, wherein the processor is further configured to:
receive one or more data packets to be sent to the respective UE, which is attached to the radio access network;
analyze the received one or more data packets by extracting information included in the one or more received data packets;
determine a permitted latency for delivery of the one or more data packets to the UE, in accordance with the information extracted from the received one or more data packets, the predetermined permitted latency specifying an amount of time that is permitted for delivery of the received one or more data packets to the UE upon reception at the core network node;
in response to determining that the permitted latency exceeds a predetermined latency threshold, (i) retrieve the SAI registered for the UE, and (ii) direct a first page of the UE to cells belonging to a first paging area, wherein the first paging area is determined by the retrieved SAI.

17. The core network node according to claim 16, wherein the core network node is a serving general packet radio service, GPRS, supporting node, SGSN, in a mobile switch center, MSC.

18. A radio access node in a radio access network, RAN, to which one or more user equipment, UE, is attached, the RAN served by a core network node, the RAN comprising:
a network communication unit configured to receive and transmit radio access network application protocol messages; and
a processor configured to:
receive a radio access network application protocol, RANAP, paging message from the core network node,
process the received RANAP paging message to retrieve a service area identity, SAI, in the RANAP paging message and to initiate a first page of a UE to a first paging area determined from the SAI retrieved from the paging message,
wherein the SAI is associated with a service area that is a subdivision of a routing area subdivided into a plurality of service areas,
wherein the RANAP paging message is sent to the RAN (i) following receipt at the core network of one or more data packets to be sent to the UE and (ii) in response to a determination by the core network node that a permitted latency for delivery of the one or more data packets to the UE exceeds a predetermined threshold, the permitted latency determined in accordance with information extracted from the one or more data packets, and
wherein the permitted latency specifies an amount of time that is permitted for delivery of the received one or more data packets to the UE upon reception at the core network node.

19. The radio access node according to claim 18, wherein the radio access node is a radio network controller, RNC.

* * * * *